June 2, 1931.          G. L. HUISKAMP          1,808,464
AEROPLANE WING
Filed July 16, 1929
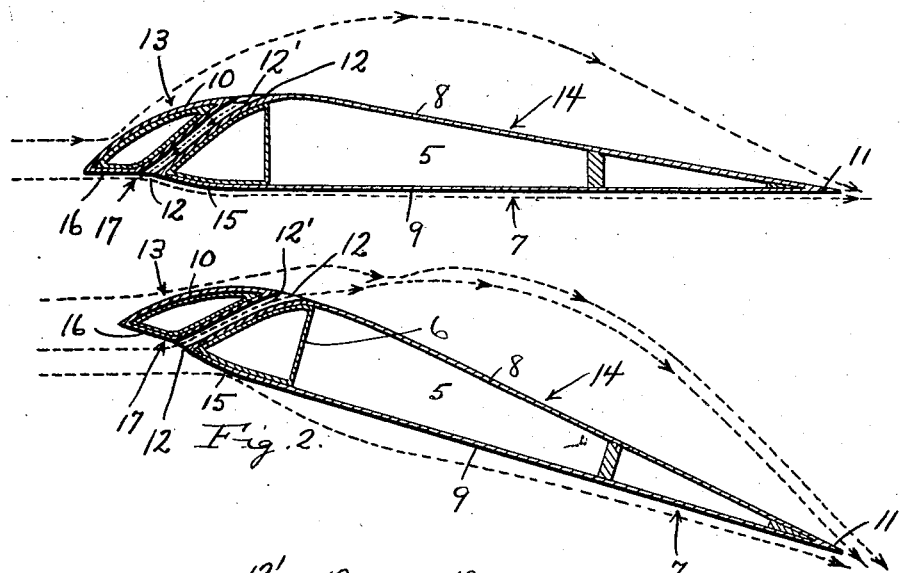
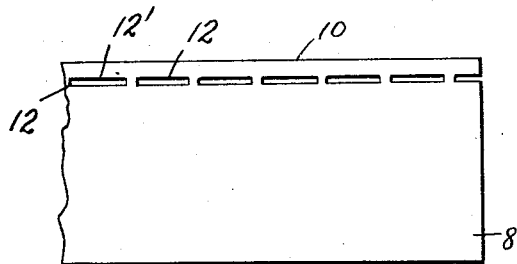
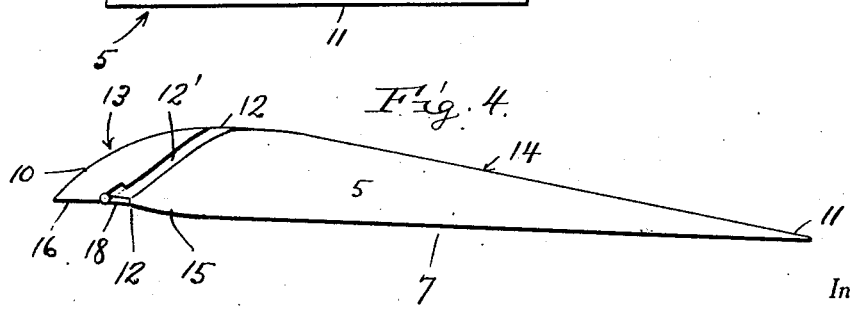
Inventor
Gerard L. Huiskamp
By Clarence A. O'Brien
Attorney Patented June 2, 1931

1,808,464

UNITED STATES PATENT OFFICE

GERARD L. HUISKAMP, OF KEOKUK, IOWA

AEROPLANE WING

Application filed July 16, 1929. Serial No. 378,703.

This invention relates broadly to aeroplane wings, and has as its primary object the provision of an improved aeroplane wing construction, the wing possessing certain structural features which render the wing capable of changing or controlling the action of air through which the wing passes during flight.

Another very important object of this invention is the provision of an aeroplane wing, provided with vents or slots in the upper and lower surfaces of the wing, having the forward and rearward portions of the wing so disposed with respect to one another adjacent the slotted portions of the wing as to compress the air prior to its reception in the slot so that the action of the compressed air through the slots enable the wing to control or change the action of the air through which the wing passes.

Another salient feature of the invention is the provision of a wing of the character above mentioned, wherein the forward and rearward portions of the wing adjacent the slots are so disposed or offset with respect to one another as to provide as it were a notch for the reception of the air prior to its passage through the slots, this notch creating a pressure surface when the angle of incidence of the wing is increased beyond a certain point, said point to be determined for each wing depending on its purpose and use.

Another object of this invention is to provide a wing of the above mentioned character, which is simple in construction, strong, durable, positive in its operation, practical, reliable, and otherwise thoroughly adapted for the purpose intended.

Other objects and advantages of the invention will become more apparent from a study of the following description, taken in connection with the accompanying drawings; wherein:

Figure 1 is a vertical cross section through an aeroplane wing constructed in accordance with the present invention and showing the wing positioned as when in horizontal flight.

Figure 2 is a view similar to Figure 1 showing the position of the wing at an increased angle of incidence.

Figure 3 is a fragmentary top plan view of the wing.

Figure 4 is an edge elevation of a slightly modified form of wing, the same herein illustrated to disclose the use of a valve in conjunction with a type of wing apprehended by this invention.

With reference more in detail to the drawings, wherein like numerals refer to similar parts throughout the several views, it will be seen that I have designated an aeroplane wing generally by the reference character 5. The construction of the wing is somewhat in conformity to the conventional construction of aeroplane wings, in that it embodies a frame of metal, or any suitable material, the frame being designated generally by the reference 6, and a covering of suitable material disposed over the frame and secured thereto in any manner so desired, the covering being designated generally as at 7 and so extending about the frame as to provide an upper surface 8, and a wing surface 9.

The wing also embodies the downwardly curved leading edge 10 and the reduced substantially flat trailing edge 11. The peculiar construction of this wing is first in the provision of slots 12 formed in the upper and lower surfaces respectively of the wing, the frame of the wing being such as not to interfere with but rather to permit of an uninterrupted passage or passages extending diagonally through the wing from the bottom to the top surface thereof.

As shown, there is generally a plurality of these slots 12, the slots being arranged in longitudinal spaced relation, and extending longitudinally of the wing from end to end, the slots being further spaced rearwardly from the leading edge of the wing. As is obvious, these slots divide the wing into a forward aero-foil designated generally by the reference character 13 and a rearwardly following aero-foil 14. The rearward airfoil 14 at its leading edge, which edge provides one wall of the passage 12' formed by the registering slots 12 in the upper and lower surfaces of the wing, is offset at its bottom surface as at 15. The bottom surface of the forward aero-foil 13 from its leading to its trailing edge is a relatively horizontal plane as designated at 16. The offset 15 of the rearward aero-foil 14 extends below the plane of the bottom surface 16 of the forward aero-foil, thus constituting therewith what may be termed a notch 17.

Thus it will be seen that this notch 16 leads as it were to the slots formed in the lower surface of the aeroplane wing. Attention is now directed to Figure 1, wherein the result of this construction upon the air through which the wing passes during flight of the aircraft is diagrammatically depicted. As therein illustrated, it will be seen that the position of the wing is that which the wing would maintain when in horizontal flight, that is the wing is in substantially a horizontal plane. In this connection, it will be seen that the air striking the leading edge of the wing, which is also the leading edge of the forward aero-foil 13 is deflected upward to continue its flight rearwardly above the top surface of the wing as shown in dotted line. This upward deflection of the air and its consequent passage rearwardly above the top surface of the wing will create a vacuum along the upper surface of the wing.

This vacuum for the sake of clarity, is designated generally by the reference character V. The horizontal surface, that is the plane's smooth bottom surface at the leading edge portion of the wing, which surface constitutes the bottom of the leading aero-foil 13 permits the passage of the air around this surface without disturbance, the air as it continues rearwardly of the wing will of course strike the offset portion 15 which is in other words, substantially the leading edge of the trailing or rearward aero-foil 14, the air consequently being deflected downwardly as illustrated in dotted lines.

In passing the lower opening of the vent or passage 12' formed by the said slots 12 in the upper and lower surfaces of the wing will create a friction which exhausts the air in the vent as illustrated by the arrows in the vent such as is obvious since the top opening of the vent in this position is a vacuum, no other action is produced.

Attention is next directed to Figure 2, wherein is illustrated the position of the wing during flight and at an increased angle of incidence. In this connection it is to be noted that the air sweeps along the leading edge of the wing, which is of course, the forward or leading edge of the forward aero-foil 13 to pass over and above the top opening of the vent 12', which of course said top opening is the slot 12 in the upper surface of the wing. At the same time, the air is caught under the leading edge of the aeroplane wing on the short plane bottom surface 16 of the leading aero-foil which surface may be also designated as the pressure surface, since obviously this surface has a compressing action upon the air striking thereagainst, due of course to the provision of the notch 17 formed therein as described.

Thus, the air being caught under this surface, and as it were, within the notch 17 to be compressed therein, the air is consequently in a somewhat compressed condition, forced through the vent 12' from the bottom to the top of the vent, from the lower slots to the top slots, to pass through the top slots in a form of jet. The jet of air escaping from the vent 12' in this manner will strike the air which is just beginning to eddy from the deflection of the leading edge of the forward aero-foil as is clearly illustrated. Likewise, certain of the air which escapes the notch will strike against the offset 15 to be deflected downwardly and along the under surface of the wing as shown.

Thus it will be seen that the relative position of a forward and trailing aero-foil 13 and 14 respectively, with the trailing aero-foil 14 offset with respect to the leading aero-foil, allowing the trailing aero-foil 14 to begin rearwardly or behind the leading aero-foil 13, the offset 15 providing for the said trailing aero-foil a leading edge of its own, which leading edge also results from a formation of the vents 12' as will be appreciated, with the result that the short notch 17 is formed with the leading portion of the entire wing taken as a whole, said notch acting as a compression chamber for the air prior to its passage through the vents 12' from the bottom to the top of the vent. The notch acting as a compression chamber only in the event that the wing is at an increased angle of incidence as at Figure 2, the notch being neutral or negative in action when the wing is in a horizontal position as shown in Figure 1. This creation of pressure formed by the notch when the wing is in that position shown in Figure 2, so arranged with relation to the vents 12' to permit the air to be led from this pressure chamber through the vents from the underside of the leading edge of the wing, through the wing, to exhaust from the vent in jets at the top surface of the wing as has been herein described.

As shown in Figure 4, I have provided valves 18 hingedly located in the slots in the lower surface of the wing to control the vent or passage 12'. These valves 18 may be manually controlled through means not shown, or suitable means may be provided, whereby the valves may be automatically controlled by pressure for closing their respective slots.

However the main idea of this invention is the provision of means whereby air may be passed through the wing to exhaust at the upper surface of the wing, the action of the air being in this manner changed or controlled by the wing.

From the foregoing, it will be seen that I have provided a wing structure which is capable of controlling the air through which the wing passes, the construction being such as to render the possibility of the construction of a wing of this nature, in a very simple, compact, reliable and thoroughly practical manner, and which will at all times be positive in operation, and fully capable of attaining the results as above enumerated, and their manner of attainment specifically described.

Even though I have herein shown and described the preferred embodiment of my invention, it is to be understood that the same is susceptible to changes fully comprehended by the spirit of the invention as herein described, and the scope of the appended claims.

Having thus described my invention, what I wish to claim as new is:

1. An aeroplane wing having one or a plurality of passages formed therein and extending therethrough from the top to the bottom surface thereof, said wing having a notch formed in the undersurface thereof, the notch extending rearwardly from the leading edge of the wing and communicating with said passages rearwardly of the leading edge of the wing.

2. In an aeroplane wing structure of the class described, a wing having one or a plurality of passages or vents formed therein and extending obliquely therethrough from the top to the bottom surface thereof, said passages being formed in the wing inwardly from the leading edge of said wing, the wing having that portion of its undersurface adjacent the passages curving downwardly below the plane of the undersurface of that portion of the wing which continues from the opposite side of the passages to the leading edge of the wing, the undersurface of the last mentioned portion of the wing being plane and constituting in conjunction with the downwardly curved portion of the undersurface of the wing a compression chamber communicating with the said vents, all in the manner and for the purpose specified.

3. In a wing structure of the class described, a wing embodying upper and lower surfaces, said wing being provided on said upper and lower surfaces with one or a plurality of vents, the vents on the upper surface of the wing being disposed rearwardly of the vents on the lower surface of the wing, said wing being further formed to provide passages whose inlet and outlet is defined by the respective vents on the upper and lower surfaces of said wing, said wing having that portion of its lower surface disposed rearwardly of the slots formed therein being offset downwardly, said wing having its undersurface plane, where said surface leads from the notches formed therein to the leading edge of the wing, to form in conjunction with the downwardly offset portion of the bottom surface of the wing a pressure surface when the angle of incidence of the wing is increased beyond a predetermined point.

4. In a wing structure of the class described, a wing embodying upper and lower surfaces, and having longitudinally spaced vents formed in the upper and lower surfaces thereof, the vents in the upper surface being arranged rearwardly with respect to the vents in the bottom surface, that portion of the wing rearwardly of the vents being offset at the bottom surface thereof with respect to that portion of the wing continuing from the opposite sides of the vents to the leading edge of the wing, the said portion of the wing leading from said opposite sides of the slots to said leading edge having the undersurface thereof substantially a horizontal plane and constituting with the offset portion a pressure surface for the leading portion of the wing, said wing being further formed to provide passages whose inlet and outlet is defined by the respective vents on the upper and lower surfaces of said wing and communicating with the pressure surface, the location of said pressure surface being such that in horizontal flight the action of pressure surface and vents upon the air through which the wing passes will be neutral, a vacuum being created both along the upper surface of the wing above the vents formed therein, and immediately at the opening of vents on the lower surface of the wing.

5. In a wing structure of the class described a wing provided with one or a plurality of spaced passages extending diagonally therethrough from the top to the bottom surface thereof, said wing being formed at its lower surface adjacent its leading edge with a lateral notch communicating with the passages at the bottom of the wing inwardly from the leading edge of the wing, said notch constituting a pressure surface which is neutral or negative in action when the wing is in horizontal flight, but adapted to increase pressure when the angle of flight of the wing is increased beyond a certain predetermined point.

6. In a wing structure of the class described, a wing provided with one or more spaced passages extending therethrough from the top to the botom surface thereof, said wing at its bottom surface so formed at opposite sides of the passages as to provide a plane surface continuing from one side of the passages to the leading edge of the wing, and a convex surface immediate the opposite sides of the passages to provide a pressure surface which is neutral or negative in action when the wing is in horizontal flight, but adapted to increase pressure when the angle of flight of the wing is increased beyond a predetermined point, so that the air exhausting from the passages at the top of the wing will so exhaust in the form of jets for striking the air which is just beginning to eddy rearwardly from the leading edge of the aeroplane wing.

7. In a wing structure of the class described, a wing provided with one or more spaced passages extending diagonally therethrough from the top to the bottom surfaces thereof, said wing at the bottom thereof and on opposite sides of the passages being so formed as to provide a pressure chamber cooperating with the passages to control or change the action of air through which the wing passes incident to the angle of incidence of the wings, and valves controlling said passages at the bottom of the wings.

In testimony whereof I affix my signature.

GERARD L. HUISKAMP.